United States Patent
Specht et al.

(10) Patent No.: US 10,933,902 B2
(45) Date of Patent: Mar. 2, 2021

(54) STEERING COLUMN HAVING AN ELECTRO-MECHANICAL FIXING DEVICE

(71) Applicants: THYSSENKRUPP PRESTA AG, Eschen (LI); thyssenkrupp AG, Essen (DE)

(72) Inventors: Jean-Pierre Specht, Haag (CH); Christoph Munding, Eschen (LI)

(73) Assignees: thyssenkrupp Presta AG, Eschen (LI); thyssenkrunn AG, Essen (DE)

( * ) Notice: Subject to any disclaimer, the term of this patent is extended or adjusted under 35 U.S.C. 154(b) by 102 days.

(21) Appl. No.: 16/317,174

(22) PCT Filed: Jul. 6, 2017

(86) PCT No.: PCT/EP2017/066878
§ 371 (c)(1),
(2) Date: Jan. 11, 2019

(87) PCT Pub. No.: WO2018/011044
PCT Pub. Date: Jan. 18, 2018

(65) Prior Publication Data
US 2019/0291773 A1   Sep. 26, 2019

(30) Foreign Application Priority Data
Jul. 14, 2016 (DE) ..................... 10 2016 008 561.4

(51) Int. Cl.
*B62D 1/181* (2006.01)
*B62D 1/184* (2006.01)

(52) U.S. Cl.
CPC ............. *B62D 1/181* (2013.01); *B62D 1/184* (2013.01)

(58) Field of Classification Search
CPC ......... B62D 1/181; B62D 1/184; B62D 1/185
See application file for complete search history.

(56) References Cited

U.S. PATENT DOCUMENTS 4,503,504 A * 3/1985 Suzumura .................. B60R 1/07
                                                  280/775
4,612,822 A * 9/1986 Nishikawa ............. B62D 1/181
                                                  280/775

(Continued)

FOREIGN PATENT DOCUMENTS

DE        699 19 639 T    9/2005
DE   10 2010 039 896 A    7/2011

(Continued)

OTHER PUBLICATIONS

English Translation of International Search Report issued in PCT/EP2017/066878, dated Oct. 25, 2017.

*Primary Examiner* — Paul N Dickson
*Assistant Examiner* — Timothy Wilhelm
(74) *Attorney, Agent, or Firm* — thyssenkrupp North America, LLC

(57) ABSTRACT

An adjustable steering column for a vehicle includes a casing tube configured to rotatably mount a steering spindle. A guide bracket is connectable to the motor vehicle and includes two side cheeks between which the casing tube is arranged. An electromechanical fixing device is provided, in a release position of which the casing tube adjustable relative to the guide bracket, and in the fixing position of which the position of the casing tube is fixed. The fixing device includes a clamping bolt extending through the side cheeks and which, during the opening and closing of the fixing device, is rotatable about its axis via an electric motor, and a stroke-generating mechanism and a support bearing. The side cheeks and the casing tube are arranged between the stroke-generating mechanism and the support bearing and the electric motor acts via a pivotably mounted lever on the clamping bolt.

13 Claims, 5 Drawing Sheets

(56) References Cited

U.S. PATENT DOCUMENTS

| | | | | |
|---|---|---|---|---|
| 4,661,752 A * | 4/1987 | Nishikawa | B62D 1/181 | 307/10.1 |
| 4,752,085 A * | 6/1988 | Yamamoto | B62D 1/181 | 280/775 |
| 4,978,137 A * | 12/1990 | Futami | B62D 1/181 | 280/775 |
| 5,240,284 A * | 8/1993 | Takada | B62D 1/181 | 280/775 |
| 5,275,066 A * | 1/1994 | Hancock | B62D 1/181 | 180/78 |
| 5,477,744 A * | 12/1995 | Hoblingre | B62D 1/181 | 74/493 |
| 5,806,890 A * | 9/1998 | Sugiki | B62D 1/181 | 280/775 |
| 6,237,438 B1 * | 5/2001 | Ben Rhouma | B62D 1/184 | 74/492 |
| 6,543,807 B2 * | 4/2003 | Fujiu | B62D 1/184 | 280/775 |
| 7,178,422 B2 * | 2/2007 | Armstrong | B62D 1/184 | 280/775 |
| 7,367,246 B2 * | 5/2008 | Ben Rhouma | B62D 1/184 | 280/775 |
| 7,631,898 B2 * | 12/2009 | Bechtel | B62D 1/184 | 280/775 |
| 7,730,804 B2 * | 6/2010 | Manwaring | B62D 1/184 | 74/493 |
| 8,056,437 B2 * | 11/2011 | Rouleau | B62D 1/187 | 74/495 |
| 8,146,945 B2 * | 4/2012 | Born | B62D 1/181 | 280/775 |
| 8,701,834 B2 * | 4/2014 | Jacob | F16H 57/0471 | 184/6.12 |
| 8,763,491 B2 * | 7/2014 | Tinnin | B62D 1/184 | 74/493 |
| 8,844,400 B2 * | 9/2014 | Morinaga | B62D 1/181 | 74/495 |
| 8,882,147 B2 * | 11/2014 | Schnitzer | B62D 1/195 | 280/775 |
| 8,909,433 B2 * | 12/2014 | Jung | B62D 1/181 | 701/49 |
| 8,910,540 B2 * | 12/2014 | Bertet | B62D 1/184 | 74/495 |
| 8,985,628 B2 * | 3/2015 | Ehrlich | B62D 1/184 | 280/775 |
| 9,321,476 B2 * | 4/2016 | Morinaga | B62D 1/181 | |
| 9,428,211 B2 * | 8/2016 | Vermeersch | B62D 1/184 | |
| 9,586,610 B2 * | 3/2017 | Figlioli | B62D 1/184 | |
| 9,919,724 B2 * | 3/2018 | Lubischer | B62D 1/181 | |
| 10,449,992 B2 * | 10/2019 | Blatter | B62D 1/187 | |
| 10,648,218 B1 * | 5/2020 | Schroeder | E05F 15/616 | |
| 2004/0023746 A1 * | 2/2004 | Arihara | B62D 1/181 | 475/280 |
| 2005/0034493 A1 * | 2/2005 | Wittwer | B60R 25/04 | 70/186 |
| 2005/0081675 A1 * | 4/2005 | Oshita | B62D 1/181 | 74/493 |
| 2005/0097978 A1 * | 5/2005 | Ben Rhouma | B62D 1/184 | 74/492 |
| 2006/0005658 A1 * | 1/2006 | Armstrong | B62D 1/184 | 74/492 |
| 2006/0266151 A1 * | 11/2006 | Avers | B62D 1/181 | 74/492 |
| 2007/0068311 A1 * | 3/2007 | Shimoda | B62D 1/184 | 74/493 |
| 2008/0121489 A1 * | 5/2008 | Chevalier | F16D 3/72 | 192/105 BB |
| 2008/0128197 A1 * | 6/2008 | Kawaguchi | B62D 1/181 | 180/444 |
| 2009/0007612 A1 * | 1/2009 | Laval | B60R 25/02153 | 70/271 |
| 2011/0167948 A1 * | 7/2011 | Andrearczyk | B62D 1/184 | 74/493 |
| 2014/0260761 A1 * | 9/2014 | Soderlind | B62D 1/183 | 74/493 |
| 2015/0344063 A1 * | 12/2015 | Iwanaga | B62D 1/189 | 74/493 |
| 2015/0375769 A1 * | 12/2015 | Abboud | B62D 1/184 | 74/493 |
| 2016/0144883 A1 | 5/2016 | Vermeersch | | |

FOREIGN PATENT DOCUMENTS

| | | | |
|---|---|---|---|
| EP | 0 600 700 A | 6/1994 | |
| FR | 2 947 233 A | 12/2010 | |

* cited by examiner

STEERING COLUMN HAVING AN ELECTRO-MECHANICAL FIXING DEVICE

CROSS REFERENCE TO RELATED APPLICATIONS

This application is a U.S. National Stage Entry of International Patent Application Serial Number PCT/EP2017/066878, filed Jul. 6, 2017, which claims priority to German Patent Application No. DE 10 2016 008 561.4, filed Jul. 14, 2016, the entire contents of both of which are incorporated herein by reference.

FIELD

The present disclosure generally relates to an adjustable steering column of a motor vehicle.

BACKGROUND

Adjustable steering columns serve for the adaptation of the position of the steering wheel to the seating position of the driver and are known in a variety of embodiments. In many motor vehicles, the vertical inclination of the steering column and/or the spacing of the steering wheel to the driver can be set. After the setting of the steering column, it is fixed in the desired position. For this purpose, a multiplicity of clamping mechanisms for steering columns of motor vehicles which are adjustable in an axial and/or vertical direction are known. Since a high force is required for locking the clamping mechanism despite the use of lever elements, there is a demand for an electrically actuatable mechanism.

For safety reasons, it is furthermore necessary to identify or detect the position of the clamping mechanism at least in the closed position.

The laid-open specification FR 2 947 233 A1 discloses a clamping mechanism which can be activated by means of an electrical actuating element. Here, by means of a rotor position sensor of the motor of the electric actuating element, the state in which the fixing device is situated is determined. A disadvantage of this solution is that the monitoring of the motor is only one indication for the position of the clamping device.

Furthermore, DE 699 19 639 T2 discloses an electrical clamping mechanism, wherein a movable cam disk is attached rotationally conjointly to a worm wheel, and a cam disk which is immovable in terms of rotation is fixed by means of a seat plate to the housing. Disadvantages here are the large number of components and the associated costs. No provision is made for identifying the state of the fixing device.

Thus a need exists for an adjustable steering column having an electromechanical fixing device, which comprises a compact construction and can be reliably moved from one state into the other.

DETAILED DESCRIPTION

Figure 1:
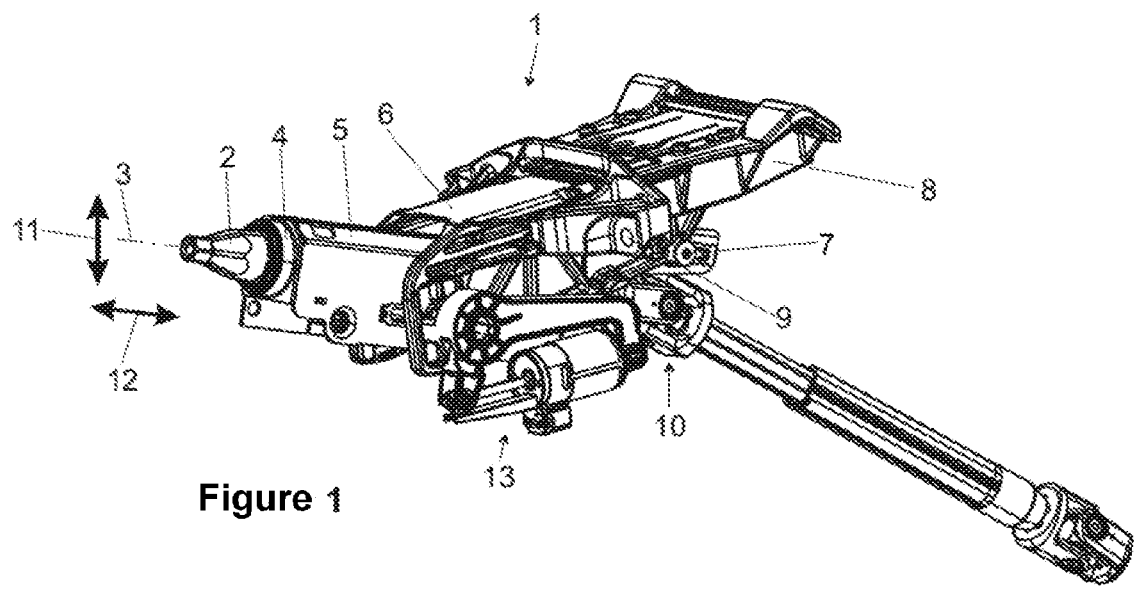
FIG. 1 is a three-dimensional view of a steering column with an electromechanical fixing device in a fixing position.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

Accordingly, a steering column for a motor vehicle is provided, which steering column is adjustable in its longitudinal direction and/or in its vertical direction, comprising a casing tube which serves for rotatably mounting a steering spindle, a guide bracket which is connectable to the body of the motor vehicle and which comprises two side cheeks between which the casing tube is arranged, an electromechanical fixing device, in the release position of which the casing tube is adjustable relative to the guide bracket in the longitudinal direction and/or in the vertical direction of the steering column, and in the fixing position of which the set position of the casing tube is fixed relative to the guide bracket, wherein the fixing device comprises a clamping bolt, which extends through the side cheeks of the guide bracket and which, during the opening and closing of the fixing device, is rotatable about its axis by means of an electric motor, and a stroke-generating mechanism and a support bearing, wherein the side cheeks of the guide bracket and the casing tube are arranged between the stroke-generating mechanism and the support bearing. Because the electric motor acts via a pivotably mounted lever on the clamping bolt, the electromechanical fixing device is particularly compact. Furthermore, a sensor is provided which is designed to detect a position of the lever. The state of the fixing device can be directly inferred from the position of the lever. It is thus possible to reliably retrieve the state of the fixing device. The sensor preferably comprises a position sensor and/or at least one limit switch. Limit switches are to be understood to mean sensors which identify when a moving object has reached a particular position. By contrast, a position sensor measures a spacing between an object and a reference point.

Both sensors make it possible to easily and reliably detect the position of the lever and thus the state of the fixing device.

The casing tube is thus configured such that it rotatably receives or bears the steering spindle formed as steering shaft.

Provision may preferably be made for the electric motor to be accommodated in a housing.

In one embodiment, the position sensor is a potentiometer with a total resistance, wherein the lever comprises a slider which is movable with the lever along a movement travel and which, by means of a sliding contact, mechanically divides the electrically fixed total resistance into two partial resistances that correspond to said total resistance. By movement of the lever by means of the electric motor, the partial resistance changes, and the position of the lever relative to a reference point can be detected.

Here, it is preferable if the slider is arranged on an end of the lever remote from the clamping bolt and comprises a movement travel which extends at least from a fixing position of the clamping bolt into a release position of the clamping bolt.

Provision may however also be made for the at least one limit switch to comprise a light barrier, wherein a position of the lever is detected by interruption of the light barrier. Such an absolute sensor may be provided in addition to the position sensor, for example in order to perform the detection of the state of the fixing device in the event of a fault. Use may however also be made exclusively of limit switches. Here, at least two limit switches are provided in order to detect the attainment of both states, release position and fixing position.

It is preferable if the stroke-generating mechanism comprises two stroke-generating disks, wherein a first stroke-generating disk is connected rotationally conjointly to the clamping bolt and a second stroke-generating disk is guided on the clamping bolt in axially displaceable fashion in the housing, and wherein the housing is mounted in floating fashion on the second stroke-generating disk. An additional fastening of housing to the body is thus not necessary, and a compact design can be made possible.

The two stroke-generating disks may for example comprise a cam contour. It is likewise conceivable and possible for rolling bodies or tilting pins to be arranged between the stroke-generating disks.

The stroke-generating mechanism may alternatively also comprise a nut which interacts with a thread on the clamping bolt and which provides a clamping stroke by means of the displacement of the nut in the direction of the axis of the clamping bolt.

In a first embodiment, a rotor shaft of the electric motor is connected rotationally conjointly to a worm, wherein the worm meshes with a worm wheel which is connected rotationally conjointly to the first stroke-generating disk. Here, the worm wheel forms the lever.

In a further embodiment, the rotor shaft of the electric motor comprises a threaded spindle which engages with a spindle nut, wherein the spindle nut is connected rotationally conjointly via the lever to the clamping bolt.

All embodiments have in common the fact that, preferably, the two stroke-generating disks as stroke-generating gearing interact with the support bearing in order to provide a clamping stroke for the fixing position of the fixing device.

Also provided is a method for setting a position of the above-described steering column in a motor vehicle, which method comprises the following steps:

after actuation of the fixing mechanism by means of an actuating device in order to set a position of a steering column, moving the fixing device into the release position by means of the electric motor;

checking the state of the fixing device by means of the sensor; if the check yields that the fixing device is not situated in the release position, starting a diagnostic procedure; if the check yields that the fixing device is situated in the release position, waiting for an actuation of the actuating device for the purposes of immobilizing the position of the steering column;

if an actuation for the purposes of immobilizing the position of the steering column is not detected in a predetermined time, moving the fixing device into the fixing position by means of the electric motor;

if an actuation for the purposes of immobilizing the position of the steering column is detected in a predetermined time, moving the fixing device into the fixing position by means of the electric motor;

checking the state of the fixing device by means of the sensor; if the check yields that the fixing device is not situated in the fixing position, starting a diagnostic procedure.

By means of this method, it can be ensured at all times that either the fixing device is situated in the desired state or an incorrect position is detected, which increases the reliability.

The diagnostic procedure preferably comprises the following steps:

electrically energizing the electric motor in the direction of the release position for a predefined period, and monitoring the sensor with regard to changes in position;

if the release position is not reached, transmitting a fault signal to the motor vehicle and activating the motor until the fixing position is reached; in the process, monitoring the sensor with regard to changes in position;

if the fixing position is not reached, transmitting a second fault signal to the motor vehicle.

FIG. 1 illustrates a steering column 1 which comprises a steering spindle 2 which is mounted, so as to be rotatable about its axis of rotation 3, in a steering spindle bearing unit 4 with a casing tube 5. The casing tube 5 is guided in a guide bracket 6 so as to be displaceable along the longitudinal axis of the steering spindle 2. The casing tube 5 is mounted in the guide bracket 6 so as to be pivotable about a pivot axis 7. The guide bracket 6 is held by a holding part 8 in the form of a console, wherein the guide bracket 6 together with the casing tube 5 can perform a displacement movement relative to the holding part 8, with an absorption of energy, in the event of a frontal vehicle collision. The energy absorption occurs as a result of the plastic deformation of a deformation element, for example a bending-tearing tab 88. The guide bracket 6 may also be referred to as a carriage. The holding part 8 may be fastened at fastening points 9 to the body (not illustrated) of a motor vehicle. The rotational movement introduced into the steering spindle 2 by a driver via a steering wheel (not illustrated) is introduced via a cardan joint 10 and further steering shaft parts into the steering gear (not illustrated). To increase driver comfort, the steering column 1 can be adjusted in terms of its height in a first adjustment direction, also referred to as vertical direction 11, and in terms of its length in a second adjustment direction, also referred to as longitudinal direction 12. For this purpose, a fixing device 13 is provided, which comprises a clamping apparatus 14.

In an embodiment which is not illustrated, provision may be made for the casing tube to be formed as an inner casing tube which is received displaceably in an outer casing tube, wherein the outer casing tube is supported pivotably by a guide bracket and the guide bracket is connectable to a body of a motor vehicle. In other words, it is possible for the guide bracket to be connected to the body of the motor vehicle both directly or with the interposition of a holding part.

Figure 2:
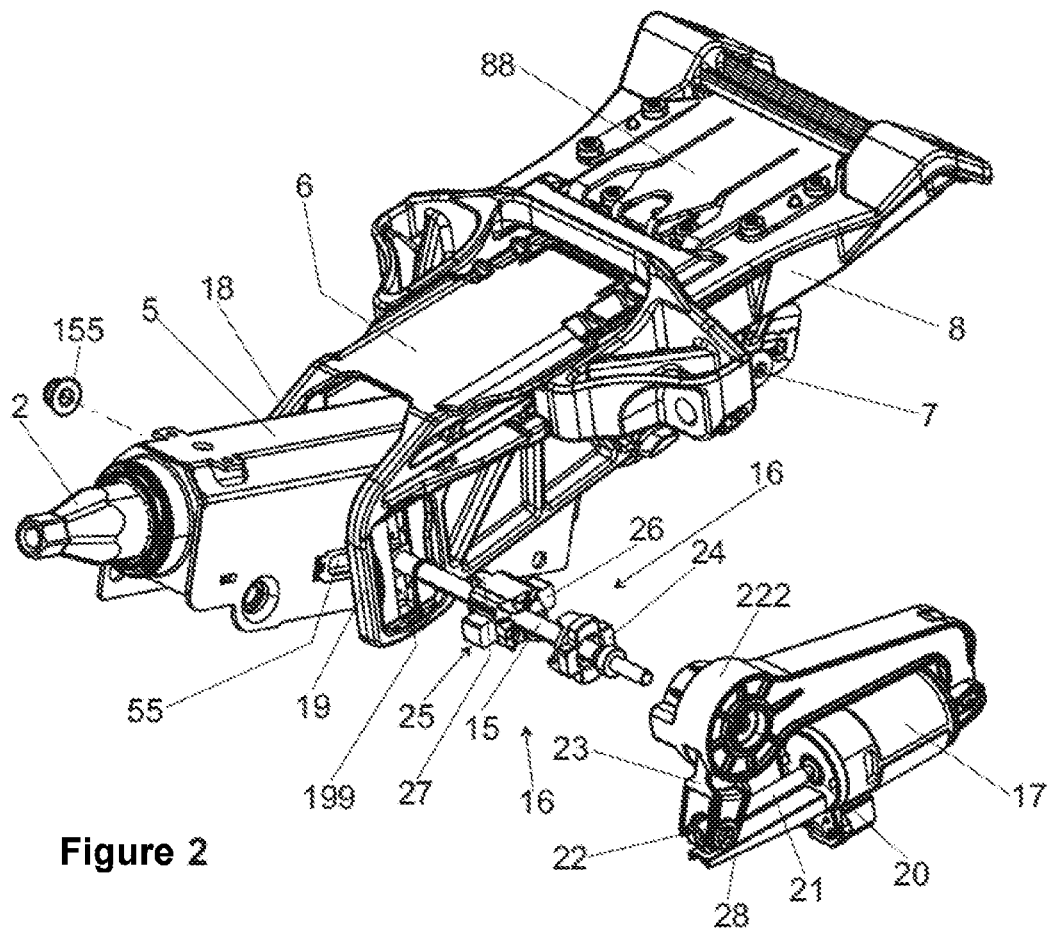
FIG. 2 is a partially exploded view of the fixing device.

As illustrated in FIG. 2, the clamping apparatus 14 comprises a clamping bolt 15, a stroke-generating mechanism 16, a support bearing 155 and an electric motor 17. In this embodiment, by rotation of the clamping bolt 15, two cams of the stroke-generating mechanism 16 are rotated relative to one another, and the side cheeks 18, 19 of the holding part 8 are pulled together, whereby frictionally locking bracing of the side cheeks 18, 19 of the holding part 8 with the side surfaces of the casing tube 5 is realized. The support bearing comprises an axial bearing and a hexagonal nut with internal thread, which is couplable to a thread of the clamping bolt 15. The axial bearing is preferably in the form of a rolling bearing, and is arranged between the side cheek 18 and the hexagonal nut.

The clamping bolt 15 extends through slots 199 in the side cheeks 18, 19 of the guide bracket and through holes 55 in the side surfaces of the casing tube 5. The stroke mechanism 16 is arranged on that end of the clamping bolt 15 which is close to the electric motor, and the support bearing 155 is arranged on the other end of the clamping bolt 15. The side cheeks 18, 19 and the casing tube 5 are arranged between the stroke-generating mechanism 16 and the support bearing 155.

By rotation of the clamping bolt 15, the fixing device can be switched selectively into a release position, also referred to as opened position, or a fixing position, also referred to as closed position. In the release position, the steering spindle 2, or the steering wheel fastened thereto (not illustrated in the figures), can be adjusted in terms of its position, in particular displaced in the longitudinal direction and in the height or tilt direction. In the fixing position of the fixing device 13, the casing tube 5 is fixed in its position relative to the guide bracket 6.

The electric motor 17 comprises a rotor shaft 20 with a threaded spindle 21, which is in operative engagement with a spindle nut 22. The spindle nut 22 is connected to a lever 23, which is connected rotationally conjointly to a first cam disk 24, which interacts with a second cam disk 25 as a stroke gearing for the purposes of providing a clamping stroke. The spindle nut 22 is connected to the lever 23 so as to be pivotable about an axis oriented orthogonally with respect to the longitudinal axis of the threaded spindle 21. The electric motor 17 and the lever 23 are arranged in a housing. The second cam disk 25 comprises two lugs 26 which project radially out of a substantially circular basic shape and which are situated diametrically opposite one another, and two projections 27 which protrude in the direction of the guide bracket 6. The housing 222 has a recess for the leadthrough of the clamping bolt 15, which is shaped so as to form a guide for the second cam disk 25 exclusively in an axial direction. A rotation of the second cam disk 25 with the clamping bolt 15 is thus ruled out. The housing 222 of the electromechanical fixing device 13 is mounted in floating fashion on the second cam disk 25 and can move axially on the clamping bolt 15 and the second cam disk 25 during the transfer between the fixing position and the release position. The electric motor 17 is held, on a side remote from the threaded spindle, on the housing 222 by means of a joint 223. Said joint 223 is necessary to compensate angular compensation that occurs during the actuation of the lever 23.

The spindle nut 22 is moved on the threaded spindle along a longitudinal axis by means of the electric motor 17. The lever 23 is connected to the spindle nut 22. A movement of the spindle nut 22 pivots the lever 23 about a pivot axis which coincides with a longitudinal axis of the clamping bolt. The lever is connected to the clamping bolt such that a pivoting of the lever 23 effects a rotation of the clamping bolt 15. Furthermore, a detection device 28 is provided which detects the position of the lever 23 and thus the state of the fixing device. The detection device 28 may comprise a potentiometer or a limit switch, for example a light barrier. A set of electronics controls safety-relevant states of the clamping.

Figure 3:
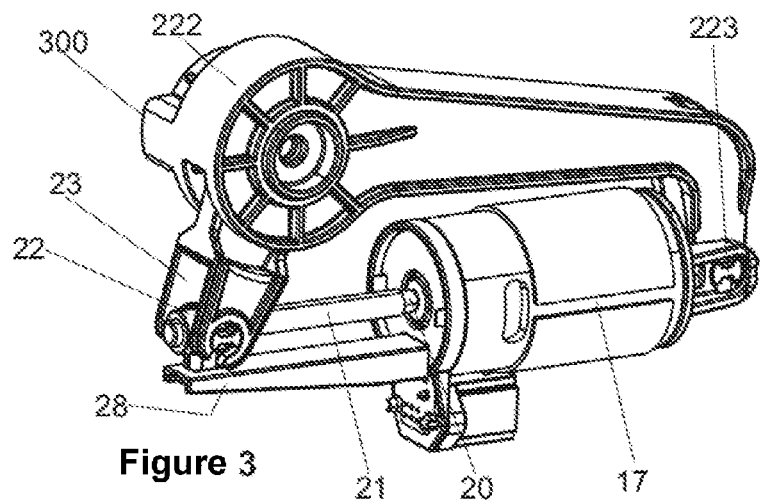
FIG. 3 is a perspective detailed view of the fixing device in the fixing position.
Figure 4:
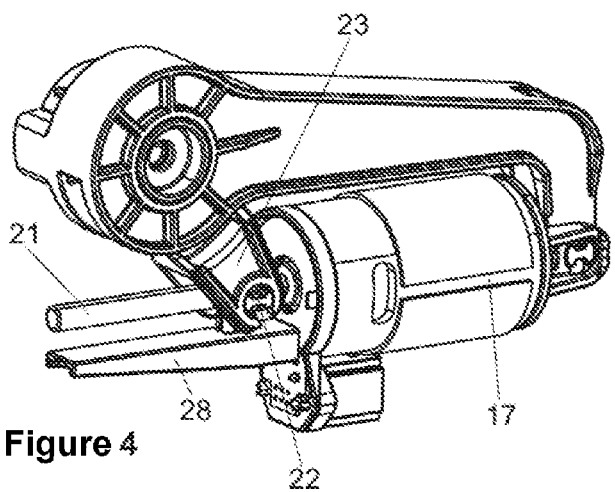
FIG. 4 is a three-dimensional view of the fixing device in a release position.

FIGS. 3 and 4 illustrate the fixing position and the release position of the fixing device in detail.

By means of a pivoting of the lever 23 or a rotation of the clamping bolt 15, the first cam disk 24 connected rotationally conjointly thereto is rotated relative to the second cam disk 25. As a result of the interaction of the two cam disks 24, 25, the spacing between the lever 23 and the casing tube 5 changes. During the transition to the fixing position, the spacing is increased by virtue of the two cam disks 24, 25 being turned away from one another and thus the depth of the two components being increased, such that the second cam disk 25 is pushed out of the recess 300 of the housing 222 and is supported on the side cheek 19 of the guide bracket 6 and, here, pulls the support bearing 155 toward the opposite side cheek 18 of the guide bracket 6. The fixing device is now braced such that the side cheeks 18, 19 of the guide bracket 6 have been pulled together, whereby frictionally locking bracing of the side cheeks 18, 19 with the side surfaces of the casing tube 5 is realized. The spacing between the fixing device 13 has a greater value in the fixing position than in the release position, because the side cheeks 18, 19 are pulled together. The position of the lever 23 is measured by means of the detection device 28.

During the transition into the release position, see FIG. 4, the first cam disk 24 is rotated relative to the second cam disk 25 until the two components engage into one another and the depth thereof decreases. As a result, the second cam disk 25 is displaced in the housing 222 axially in the direction of the lever 23, and the support bearing 155 moves away from the side cheeks 18, 19. The bracing of the fixing device 13 is thus released, and the casing tube 5 of the steering column 1 is released for adjustment.

Figure 5:
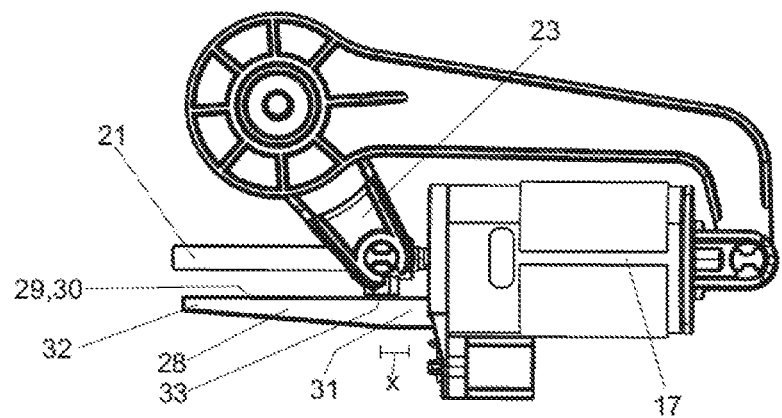
FIG. 5 is a side view of the fixing device in the release position.

The side view of FIG. 5 illustrates an exemplary embodiment of the detection device 28. A potentiometer 28 is provided as position sensor, which detects the position of the lever 23 along a lever travel relative to a reference position. The potentiometer 28 comprises an ohmic resistance with a displaceable pickup, at which a variable partial resistance can be picked up. The total resistance represents the measurement range over which a position measurement is possible. In order that the displacement position of the potentiometer can be converted into a signal value, a voltage UO is applied to the potentiometer. At the pickup of the potentiometer with the partial resistance Rx, a voltage Ux proportional to the travel x can then be measured. The position information is accordingly, by means of the potentiometer, firstly converted mechanically into a proportional ohmic resistance and subsequently changed into a proportional electrical voltage signal.

Figure 6:
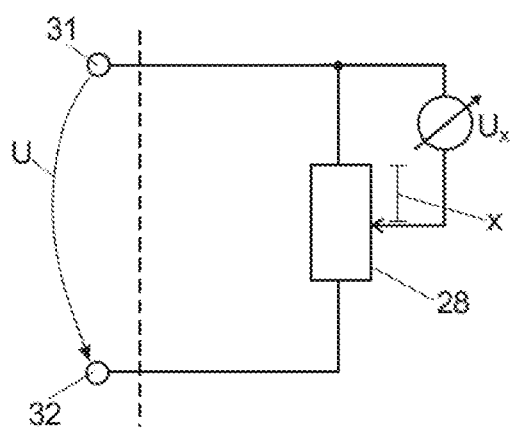
FIG. 6 is an electrical circuit with a potentiometer.
Figure 7:
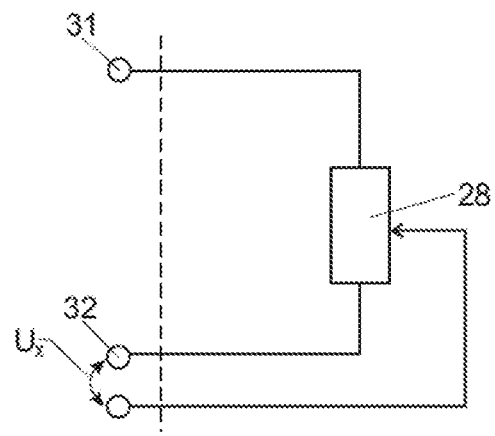
FIG. 7 is a second electrical circuit with a potentiometer.

For this purpose, the position sensor comprises a carrier with a resistance layer 29 applied to a surface 30. Said carrier is arranged fixedly with its surface 30 parallel to the rotor shaft 21 of the electric motor 17, and comprises two electrical terminals at an end 31 close to the electric motor, and at an end 32 remote from the electric motor, of the lever travel. A movable slider 33 is fixedly connected to the lever 23, which slider, by way of sliding contact, mechanically divides the electrically fixed total resistance of the carrier into two partial resistances which collectively correspond to said total resistance, and constitutes a pickup. A change in resistance can be detected by virtue of a voltage measuring unit (voltmeter), as illustrated in FIG. 6, being connected in parallel with respect to the potentiometer. The measured voltage Ux is a measure for the relative position x of the slider in relation to the ends 31, 32. FIG. 7 illustrates a second possible electrical circuit, in which the voltage Ux prevailing between ground and the pickup is measured. The sensor is calibrated to be able to assign a particular position x to a particular voltage Ux. For this purpose, movement to the stops of the movement travel of the lever (lever travel) is performed, and the measured voltage values Ux are assigned to the travel x covered. This one-off initialization is preferably performed at the assembly plant, and the measured values are stored. Therefore, in general, no further initialization is required in the automobile. In the case of such an absolute length measurement system being used, the movement speed of the fixing device can be controlled in open-loop or closed-loop fashion.

Figure 8:
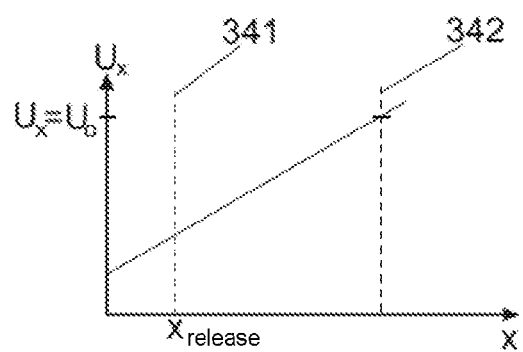
FIG. 8 is a diagram with a measured voltage of a potentiometer plotted versus a movement travel.

As illustrated in FIG. 8, on the basis of the measured voltage Ux, the state in which the fixing device is situated is determined. The diagram shows the measured voltage Ux plotted versus the movement travel x. The travel x is the movement travel of that end of the lever 23 which is remote from the clamping bolt from the end 31 close to the electric motor to the end 32 remote from the electric motor. In the fixing position 342, the lever is situated at the stop remote from the motor, in the vicinity of which stop the measured voltage Ux corresponds approximately to U0, the voltage of the total resistance. In the release position 341, the lever is situated at a position at $x >= x_{release}$, wherein $x_{release}$ is the threshold value beyond which the steering column is released for adjustment. Should a fault arise, for example as a result of the slider 33 no longer adequately making contact with the surface 30, then the prevailing resistance increases, in effect, to infinity, such that the measurable voltage falls to approximately zero. If such a situation arises, that is to say the voltage is lower than in the release position 341, then a fault is present. By means of the arrangement according to the invention, it is thus possible for a fault to be identified in a simple manner.

Figure 9:
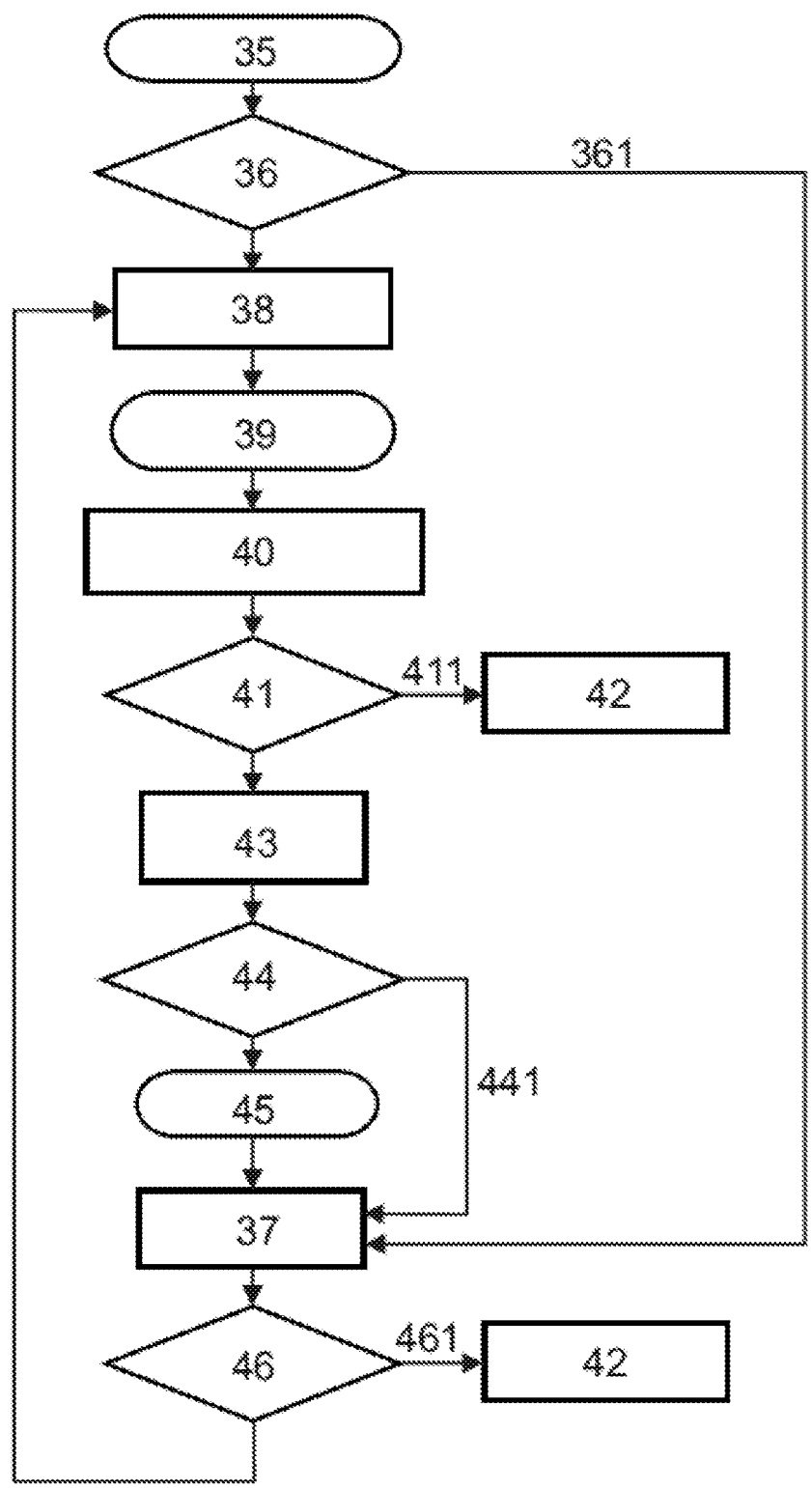
FIG. 9 is a schematic view of a method for controlling the fixing device.

FIG. 9 illustrates a flow diagram showing a method for operating the electrical fixing device.

In a first step 35, the fixing device is connected to the on-board electrical system of the vehicle. Subsequently, the state of the fixing device is queried 36. If the fixing device is situated in the release position 361, then the motor is activated in order to move 37 the device into the fixing position. If the fixing device is situated in the fixing position, then actuation 38 of the fixing mechanism by the driver for the purposes of moving the steering column is awaited. If such an actuation is detected 39, for example as a result of an actuating button being depressed, the electric motor moves the fixing device into the release position 40. Subsequently, the state of the fixing device is checked 41 again. If the query yields that the fixing device is not situated 411 in the release position, then a diagnostic procedure is started 42. By contrast, if the query yields that the fixing device is situated in the release position, a signal from the driver for the purposes of fixing the device again is awaited 43. A certain time is provided for this. If this time is overshot 44, then the electric motor is activated 441, 37 in order to fix the device in the absence of a signal from the driver. If the signal from the driver for fixing 45 arrives within the time period, the motor is thereupon likewise activated in order to move 37 the device into the fixing position. Thereafter, the state of the device is queried 46 again. If the query yields that the device is not situated 461 in the fixing position, the diagnostic procedure 42 is started again, otherwise the sequence starts from the beginning and a signal from the driver for the purposes of opening the device is awaited 38.

The diagnostic procedure comprises the following method steps:

electrically energizing the motor in the direction of the release position for a predefined period (in particular 20 s), and monitoring the position sensor with regard to changes in position;

if the release position is not reached, transmitting a fault signal to the vehicle and activating the motor until the fixing position is reached; in the process, monitoring the position sensor with regard to changes in position;

if the fixing position is not reached, transmitting a second fault signal (critical error) to the vehicle.

Provision may also be made for the fixing position to be monitored by means of an additional absolute sensor, for example a limit sensor.

The second fault signal is preferably processed by the vehicle such that a warning lamp or a display that is provided informs the driver of the state of the fixing device.

Figure 10:
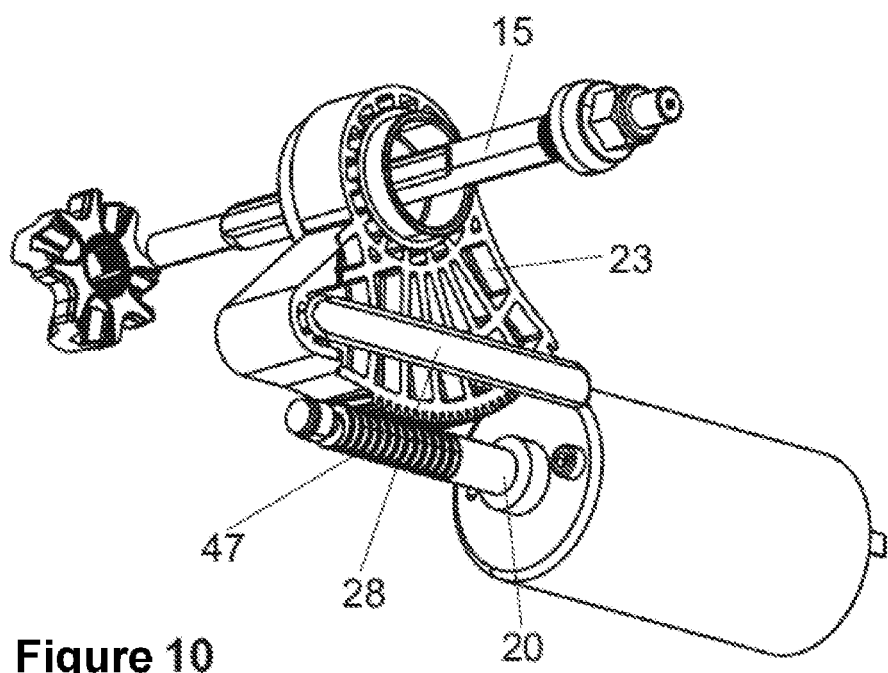
FIG. 10 is a three-dimensional view of a steering column having a stroke mechanism in a second embodiment.

In a further embodiment of FIG. 10, the lever 23 is formed by a worm wheel of segment-like form. A worm 47 is connected rotationally conjointly to the rotor shaft 20. Here, the rotor shaft 20 and the worm 47 are arranged perpendicular to the clamping bolt 15. The worm 47 meshes with the circular-sector-shaped worm wheel 23, which is mounted so as to be pivotable about the axis of rotation of the clamping bolt 15. The worm wheel 23 is operatively connected to the first clamping disk. The position sensor 28 measures the position of the lever 23 along the lever travel.

Figure 11:
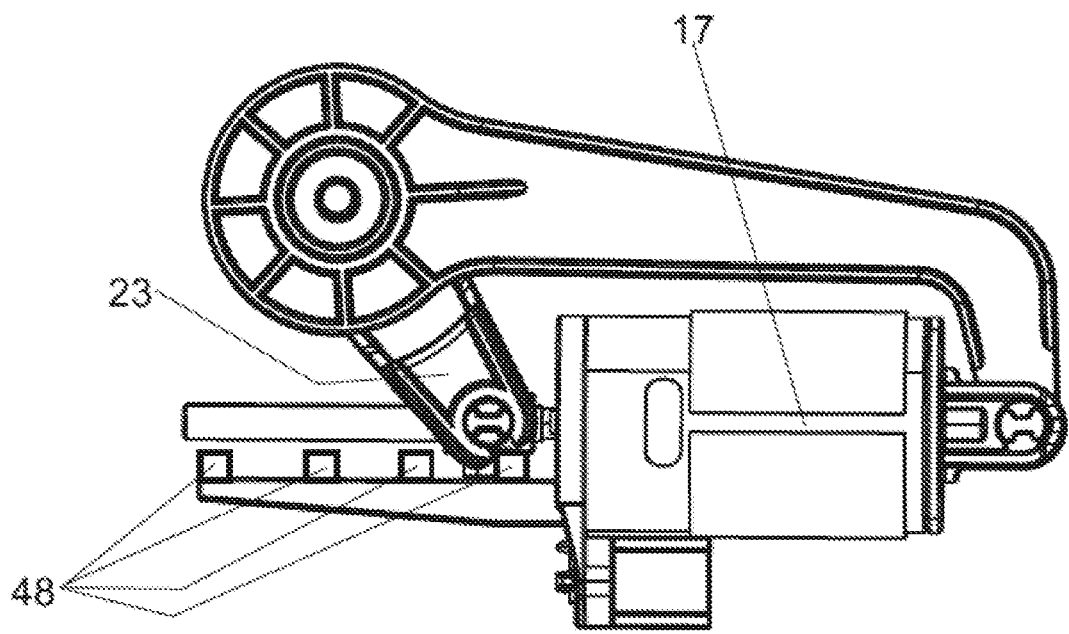
FIG. 11 is a side view of a fixing device with light barrier.

FIG. 11 illustrates a possible embodiment with a multiplicity of light barriers 48. The lever 23 moves from the fixing position into the release position and vice versa through the light barriers 48, whereby the position of the lever 28 can be determined by detecting the interruption of the light barriers. Provision may be made for a multiplicity of light barriers to be used. It is however also possible for light barriers to be used as limit switches, which are arranged only in the end regions of the lever travel and thus detect only the attainment of a fixing position or release position. In the case of multiple light barriers being arranged in the region of the fixing position, the clamping force can be set.

The adjustable steering column 1 according to the invention comprises an electromechanical fixing device 13, in the case of which the position of the lever relative to the housing is measured in order to determine the situation of the clamping lever. In this way, safety can be increased, because functional errors can be detected at an early point in time. It is preferable here if the housing of the fixing device is mounted in floating fashion on the second cam disk and can move in the axial direction of the clamping bolt. An additional fastening of the housing to the body is thus not necessary, and a compact design can be made possible. A desired modularity of the fixing device can be realized by means of different thread pitches and lever lengths. It is likewise conceivable and possible for the thread to be of single-start or multi-start design.

What is claimed is:

1. A steering column for a motor vehicle, which steering column is adjustable in its longitudinal direction and/or in its vertical direction, comprising:

a casing tube configured to rotatably receive a steering spindle therewithin,
a guide bracket configured to connect to the body of the motor vehicle, and which comprises two side cheeks between which the casing tube is disposed,
an electric motor comprising a threaded spindle extending from the electric motor and configured to rotate when the electric motor is actuated;
a nut disposed on the threaded spindle configured to move linearly when the threaded spindle is rotated;
a housing, one end of which extends to a position adjacent the threaded spindle and the other end of which is pivotally mounted to the electrical motor opposite the threaded spindle;
a lever pivotally mounted on the nut and extending to operably attach to the one end of the housing;
an electromechanical fixing device, in the release position of which the casing tube is adjustable relative to the guide bracket in the longitudinal direction and/or in the vertical direction of the steering column, and in the fixing position of which the position of the casing tube is fixed relative to the guide bracket, the fixing device comprising:
  a clamping bolt which extends through the side cheeks of the guide bracket and the one end of the housing, and which, during opening and closing of the fixing device, is rotatable about an axis thereof by operation of the electric motor via movement of the lever, and
  a stroke-generating mechanism and a support bearing, wherein the side cheeks of the guide bracket and the casing tube are arranged between the stroke-generating mechanism and the support bearing, and wherein a position sensor is provided which is configured to detect a position of the lever and a first limit sensor is configured to detect a first end position of the lever corresponding to the release position and a second limit sensor is configured to detect a second end position corresponding to the fixing position.

2. The steering column of claim 1, wherein the position sensor comprises a potentiometer with a total resistance, wherein the lever comprises a slider which is movable with the lever along a movement travel and which, by means of a sliding contact, mechanically divides the electrically fixed total resistance into two partial resistances that correspond to the total resistance.

3. The steering column of claim 2, wherein the slider is arranged on an end of the lever remote from the clamping bolt and comprises a movement travel which extends at least from a fixing position of the clamping bolt into a release position of the clamping bolt.

4. The steering column of claim 1, wherein the limit switches each comprise a light barrier, wherein a position of the lever is detected by interruption of the light barrier.

5. The steering column of claim 1, wherein the stroke-generating mechanism comprises two stroke-generating disks, wherein a first stroke-generating disk is connected rotationally conjointly to the clamping bolt and a second stroke-generating disk is guided on the clamping bolt in axially displaceable fashion in a housing, and wherein the housing is mounted in floating fashion on the second stroke-generating disk.

6. The steering column of claim 5, wherein a rotor shaft of the electric motor is connected rotationally conjointly to a worm, wherein the worm meshes with a worm wheel which is connected rotationally conjointly to the first stroke-generating disk.

7. The steering column of claim 5, wherein the two stroke-generating disks as stroke-generating gearing interact with the support bearing in order to provide a clamping stroke for the fixing position of the fixing device.

8. The steering column of claim 1, wherein a rotor shaft of the electric motor comprises a threaded spindle which engages with a spindle nut, wherein the spindle nut is connected rotationally conjointly via the lever to the clamping bolt.

9. A method for setting a position of a steering column in a motor vehicle, the steering column comprising:
a casing tube configured to rotatably receive a steering spindle therewithin,
a guide bracket configured to connect to the body of the motor vehicle, and which comprises two side cheeks between which the casing tube is disposed,
an electric motor comprising a threaded spindle extending from the electric motor and configured to rotate when the electric motor is actuated;
a nut disposed on the threaded spindle configured to move linearly when the threaded spindle is rotated;
a housing, one end of which extends to a position adjacent the threaded spindle and the other end of which is pivotally mounted to the electrical motor opposite the threaded spindle;
a lever pivotally mounted on the nut and extending to operably attach to the one end of the housing;
an electromechanical fixing device, in the release position of which the casing tube is adjustable relative to the guide bracket in the longitudinal direction and/or in the vertical direction of the steering column, and in the fixing position of which the position of the casing tube is fixed relative to the guide bracket, the fixing device comprising:
  a clamping bolt which extends through the side cheeks of the guide bracket and the one end of the housing, and which, during opening and closing of the fixing device, is rotatable about an axis thereof by operation of the electric motor via movement of the lever, and
  a stroke-generating mechanism and a support bearing, wherein the side cheeks of the guide bracket and the casing tube are arranged between the stroke-generating mechanism and the support bearing, and wherein a position sensor is provided which is configured to detect a position of the lever and a first limit sensor is configured to detect a first end position of the lever corresponding to the release position and a second limit sensor is configured to detect a second end position corresponding to the fixing position, wherein the method comprises:
moving the fixing device into the release position by means of the electric motor after actuation of the fixing mechanism by operation of the actuating device in order to set a position of a steering column,
checking the state of the fixing device by means of the position sensor and the first limit sensor;
  starting a diagnostic procedure when the check yields that the fixing device is not situated in the release position, and
  waiting for an actuation of the actuating device for the purposes of immobilizing the position of the steering column when the check yields that the fixing device is situated in the release position, moving the fixing device into the fixing position by means of the electric motor when an actuation for the purposes of immobilizing the position of the steering column is not detected in a predetermined time, moving the fixing device into the fixing position by means of the electric motor when an actuation for the purposes of immobilizing the position of the steering column is detected in a predetermined time, checking the state of the fixing device by means of the position sensor and the second limit sensor;

starting a diagnostic procedure when the check yields that the fixing device is not situated in the fixing position.

10. The method of claim 9, wherein the stroke-generating mechanism comprises two stroke-generating disks, wherein a first stroke-generating disk is connected rotationally conjointly to the clamping bolt and a second stroke-generating disk is guided on the clamping bolt in axially displaceable fashion in a housing, and wherein the housing is mounted in floating fashion on the second stroke-generating disk.

11. The method of claim 9, wherein the diagnostic procedure comprises:

electrically energizing the electric motor in the direction of the release position for a predefined period, and monitoring the position sensor with regard to changes in position;

transmitting a fault signal to the motor vehicle and activating the motor until the fixing position is reached; in the process, monitoring the position sensor with regard to changes in position when the release position is not reached; and transmitting a second fault signal to the motor vehicle when the fixing position is not reached.

12. The method of claim 11, wherein the position sensor comprises a potentiometer with a total resistance, wherein the lever comprises a slider which is movable with the lever and which, by means of a sliding contact, mechanically divides the electrically fixed total resistance into two partial resistances that correspond to said total resistance.

13. The method of claim 12, wherein the slider is disposed on an end of the lever remote from the clamping bolt and comprises a movement travel which extends at least from a fixing position of the clamping bolt into a release position of the clamping bolt.

* * * * *